(12) United States Patent
Drake

(10) Patent No.: US 7,798,034 B2
(45) Date of Patent: Sep. 21, 2010

(54) APPARATUS AND METHODS FOR RETAINING PINS AND BUSHINGS

(75) Inventor: Frank Drake, Wausau, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 1001 days.

(21) Appl. No.: 11/585,022

(22) Filed: Oct. 23, 2006

(65) Prior Publication Data

US 2007/0090333 A1   Apr. 26, 2007

Related U.S. Application Data

(60) Provisional application No. 60/729,381, filed on Oct. 21, 2005.

(51) Int. Cl.
*F16H 57/02* (2006.01)
*B60S 9/02* (2006.01)

(52) U.S. Cl. .................... 74/412 R; 74/417; 74/431; 74/606 R; 403/316

(58) Field of Classification Search .............. 74/431, 74/412 R, 414, 417, 421 R, 89.23; 254/425; 403/315–318
See application file for complete search history.

(56) References Cited

U.S. PATENT DOCUMENTS

| 881,075 | A | 3/1908 | Hosking |
| 1,593,364 | A | 7/1926 | Schwerin |
| 1,618,253 | A | 2/1927 | Wilson |
| 2,291,253 | A | 5/1939 | Osborn |
| 3,215,458 | A | 11/1965 | Nelson et al. |
| 4,183,424 | A | 1/1980 | Rumyantsev et al. |
| 4,392,759 | A | 7/1983 | Cook |
| 4,448,564 | A | 5/1984 | Orszulak |
| 5,092,821 | A | 3/1992 | Gilbert et al. |
| 6,250,170 | B1 * | 6/2001 | Hill et al. .................. 74/89.23 |
| 6,446,937 | B1 | 9/2002 | Straw, Sr. et al. |
| 6,536,644 | B2 | 3/2003 | Plow |
| 6,672,794 | B2 | 1/2004 | Reichborn |
| 6,826,976 | B2 | 12/2004 | Whitebread et al. |
| 2004/0159827 | A1 * | 8/2004 | Drake, III .................. 254/425 |
| 2007/0210289 | A1 | 9/2007 | Drake |

* cited by examiner

*Primary Examiner*—William C Joyce
(74) *Attorney, Agent, or Firm*—McDonald Hopkins LLC

(57) ABSTRACT

A retention assembly for a jack is disclosed. The retention assembly includes a housing, a bushing, a shaft, a gear, a pin, and a spring. The housing includes a housing aperture, into which the bushing is positioned. The shaft, which includes a shaft aperture, extends through the bushing such that the portion of the shaft defining the shaft aperture is positioned within the housing. The gear, which includes a gear aperture, is positioned on the shaft such that the gear and shaft apertures align to accommodate the pin. The spring is positioned on the shaft and within the housing such that a first end of the spring applies a force to the bushing to retain the bushing in the housing aperture and a second end of the spring engages the pin to retain the pin within the shaft and gear apertures.

19 Claims, 3 Drawing Sheets

APPARATUS AND METHODS FOR RETAINING PINS AND BUSHINGS

CROSS-REFERENCE TO RELATED APPLICATION

This application claims priority from U.S. Provisional Patent Application No. 60/729,381, filed on Oct. 21, 2005, and titled SPRING RETAINING PIN AND BUSHING DEVICE, which is hereby incorporated in its entirety by reference.

FIELD OF THE INVENTION

The present invention generally relates to jack assemblies, and more particularly, the present invention relates to apparatus and methods for retaining pins and bushings in a jack assembly.

BACKGROUND OF THE INVENTION

In the mechanical jack industry, and specifically where mechanical jacks are used with trailers, there is a continuing need for novel apparatus and methods to improve the reliability and ease of maintenance of jack assemblies. Mechanical jacks commonly are comprised of a number of components retained within a housing. In order for a service technician to service, modify, or repair a jack, the technician must often disassemble and subsequently reassemble the jack. The disassembly is especially required when the service, modification, or repair regards a component positioned near the bottom of the jack. Internal mechanisms of jacks are normally accessed by removing a cover on the top of the jack and removing multiple components to gain access to the desired component or location. Once the service, modification, or repair is completed, the removed components are reinstalled and the cover is placed back on the jack. Disassembly and reassembly of the jack can often be time consuming, tedious, and may lead to the damaging of jack components.

In many prior art jacks, the components just below the cover are a cross shaft supported on a pair of bushings, a bevel pinion gear coupled to the shaft, and a mating bevel gear engaged with the pinion gear. A pin securing the pinion gear to the cross shaft is commonly held in place by an interference fit between the pin and apertures in the pinion gear and cross shaft. Such an interference fit may make it extremely difficult to remove the pin from the pinion gear and shaft apertures when it is necessary to service the jack. In order to service a jack, a technician may be required to forceably remove the pin from the apertures. Such forceable removal is commonly accomplished by placing a punch in contact with the pin and applying repeated hammer strokes to the punch to dislodge the pin from the apertures. This processes of hammering often leads to permanent damage to the pin, the pinion gear, and the shaft. Repeated hammer strokes applied to the pin may also result in the pin being pushed down into the jack assembly, further damaging other components of the jack. In addition, the pin may be pushed down into a location within the jack assembly where it cannot be easily retrieved by the technician.

The cross shaft is commonly coupled to a jack by bushings positioned in the walls of a jack housing. Such bushings are commonly retained in the jack housing by an interference fit between the bushing and the bushing aperture in the wall of the housing. Similar to the interference fit of the pin described above, the interference fit of a bushing and an aperture in the housing may also result in difficulty in removing the bushing to service the jack. Hammering techniques may again be necessary to remove the bushing from the housing, leading to damage to the housing, the shaft, the bushing, and other components of the jack.

Additionally, the use of interference fits in the design of jack assemblies necessitates the manufacturing of pins, bushings, shafts, pinion gears, and housings with relatively small or tight manufacturing tolerances and dimensional variances. Such restrictive tolerances and variances lead to costly manufacturing and assembly processes for original as well as replacement components and assemblies. Such tight tolerances also restrict the use of original or replacement parts to specific jack assemblies. Original and replacement pins, bushings, shafts, pinion gears, and housings may fit only a small, select group of jacks, which may lead to costly levels of inventory and long lead times in obtaining replacement parts.

The disadvantages of the prior art as described herein, make it desirable to develop novel apparatus and methods regarding jack assemblies to facilitate more efficient and reliable servicing methods to reduce the time needed to service a jack assembly and reduce damage to jack components during servicing. Further, it is useful to eliminate the need for relatively tight manufacturing tolerances and variances. Accordingly, novel apparatus and methods for securing a pinion gear to a cross shaft or securing a bushing to a jack housing that overcome the disadvantages of the prior art are desired.

SUMMARY OF INVENTION

The present invention includes novel apparatus and methods for retaining and securing a pin used to engage a pinion gear to a cross shaft in a jack assembly. Further, the present invention includes apparatus and methods for retaining and securing a bushing used to support the cross shaft within a jack assembly. In an embodiment of the present invention a retention assembly for a jack includes a housing, a bushing, a shaft, a gear, a pin, and a spring. The housing includes a housing aperture, into which the bushing is positioned. The shaft, which includes a shaft aperture, extends through the bushing such that the portion of the shaft defining the shaft aperture is positioned within the housing. The gear, which includes a gear aperture, is positioned on the shaft such that the gear and shaft apertures align to accommodate the pin. The spring is positioned on the shaft and within the housing such that a first end of the spring applies a force to the bushing to retain the bushing in the housing aperture and a second end of the spring engages the pin to retain the pin within the shaft and gear apertures.

DESCRIPTION OF THE DRAWINGS

Objects and advantages together with the operation of the invention may be better understood by reference to the following detailed description taken in connection with the following illustrations, wherein.

DETAILED DESCRIPTION

While the present invention is described with reference to the embodiments described herein, it should be clear that the present invention should not be limited to such embodiments. Therefore, the description of the embodiments herein is illustrative of the present invention and should not limit the scope of the invention as claimed.

Figure 1:
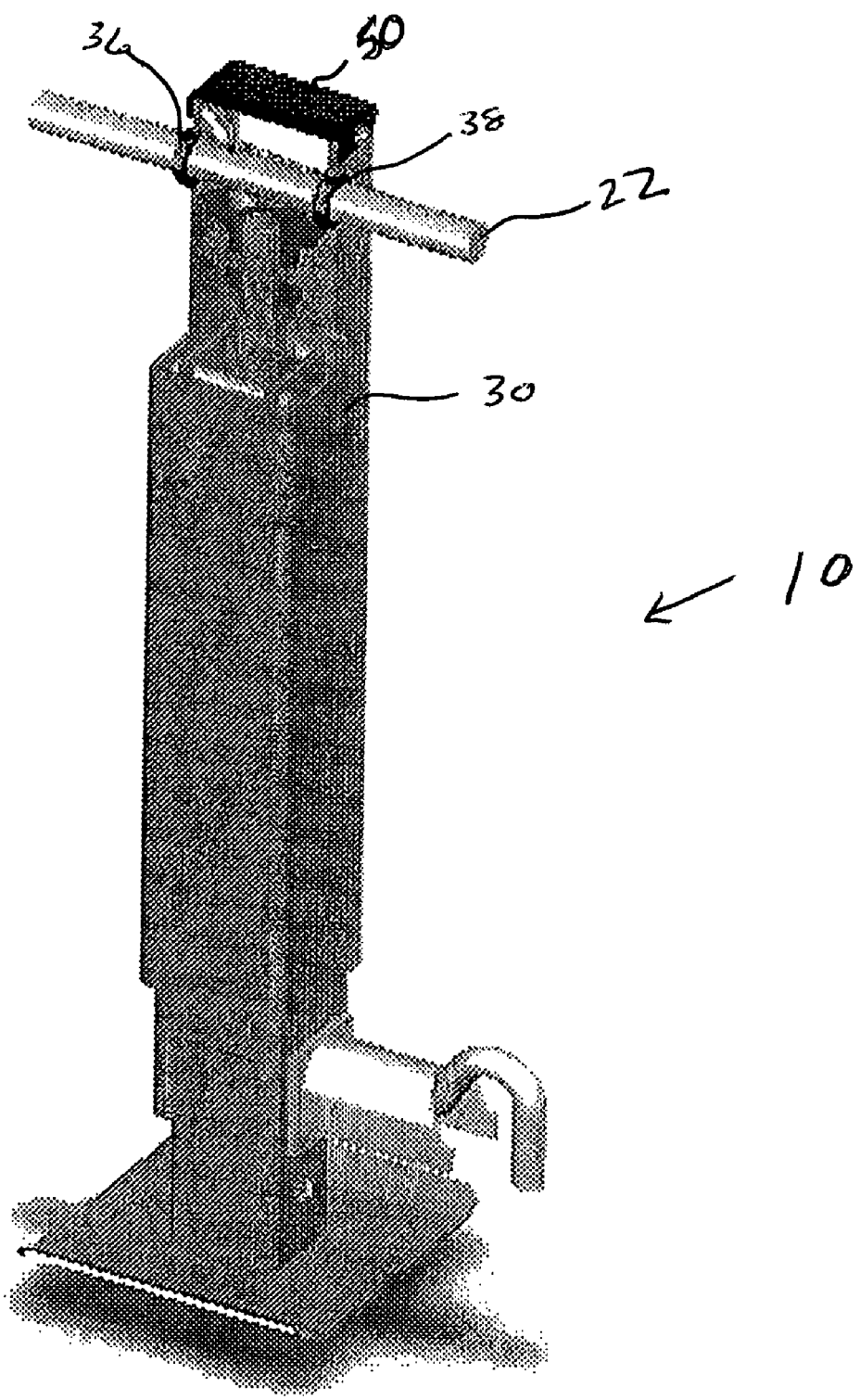
FIG. 1 is a perspective view of a jack assembly in accordance with the present invention, with a portion of a jack housing removed.
Figure 2:
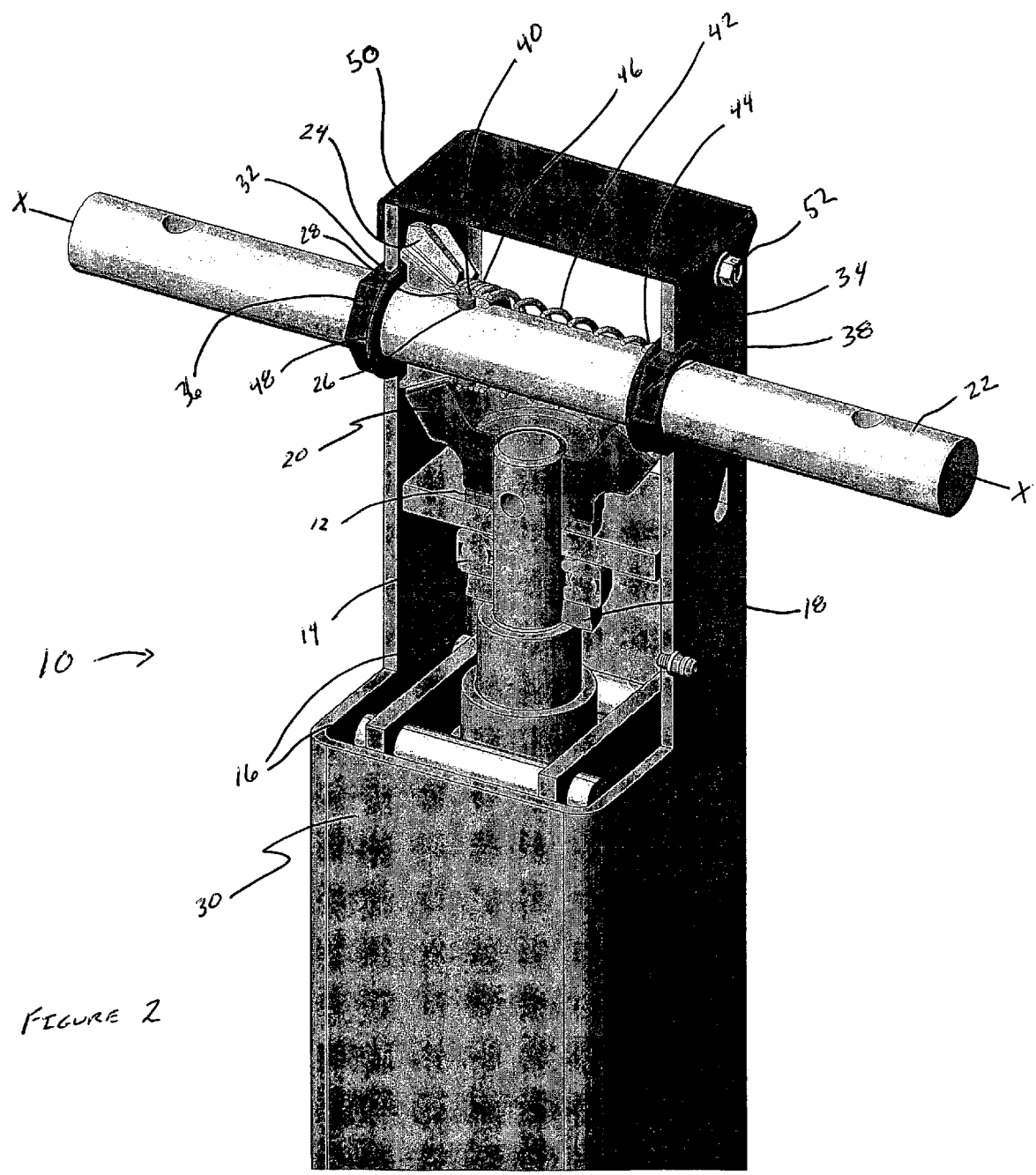
FIG. 2 is a detailed partial cross-sectional perspective view of the internal mechanisms of the jack assembly of FIG. 1.
Figure 3:
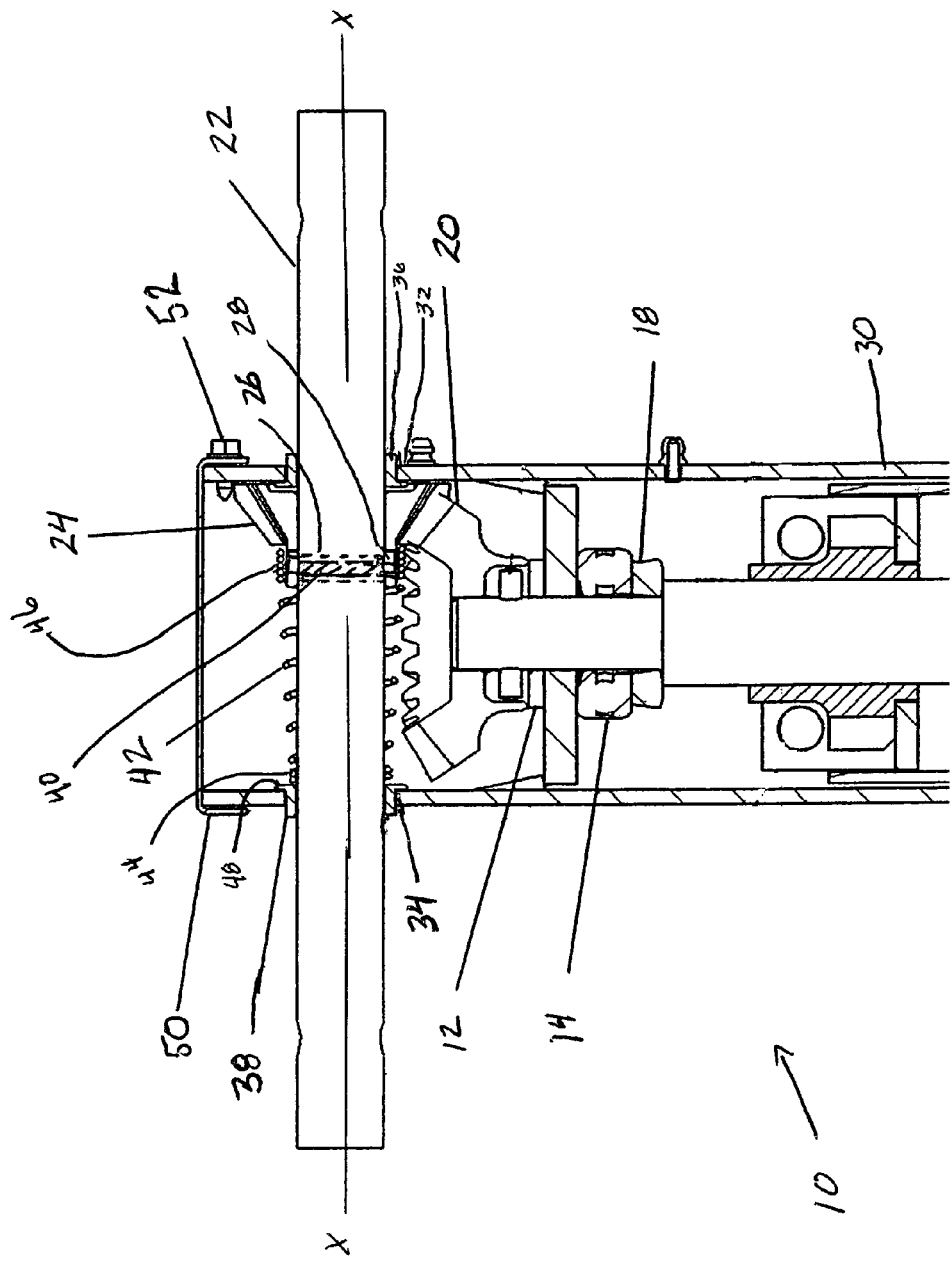
FIG. 3 is a front cross-sectional view of the internal mechanisms of the jack assembly of FIG. 1.

FIGS. 1 through 3 illustrate an embodiment in accordance with the present invention. With referring to FIGS. 2 and 3, common components of a jack assembly 10 will be described. FIG. 2 illustrates a partial cross-section perspective view of a jack assembly 10 and FIG. 3 illustrates a front cross-section view of a jack assembly 10. A jack assembly 10 commonly includes a wear plate 12, a thrust bearing 14, a pair of retaining pins 16, a bearing seat 18, a bevel gear 20, a cross shaft 22, and a bevel pinion gear 24. The shaft 22 includes a shaft aperture 26 (as best seen in FIG. 3) extending through the shaft 22. The bevel pinion gear 24 includes a bevel pinion gear aperture 28 (as best seen in FIG. 3) extending through the pinion gear 24. These components of the jack assembly 10 are generally positioned within a housing 30 and arranged to facilitate the raising and lowering of the jack 10. With reference to FIGS. 2 and 3, it will be appreciated that apparatus and methods that provide for the efficient removal of the cross shaft 22 facilitate efficient access to many critical jack components positioned below the cross shaft 22.

As is seen in FIG. 2, the bevel pinion gear 24 is positioned on the shaft 22 and located to one side of the housing 30. The jack assembly 10 includes several pairs of components. To improve clarity and ease of description, such pairs of components will be described as either proximate or distal throughout the following detailed description. Component that are referred to as proximate are generally located on the same side of the housing 30 as the bevel pinion gear 24. Components that are referred to as distal are generally located on the opposite side of the housing 30 from the bevel pinion gear 24.

The housing includes a pair of housing apertures, a proximate housing aperture 32 and a distal housing aperture 34. A pair of bushings are positioned in the housing apertures 32, 34. A proximate bushing 36 is positioned in the proximate housing aperture 32 and a distal bushing 38 is positioned in the distal housing aperture 34. The shaft 22 passes through the proximate and distal bushings 36, 38, with a first portion of the shaft 22 in contact with the proximate bushing 36 and a second portion of the shaft 22 in contact with the distal bushing 38. The shaft 22 and bushings 36, 38 are arranged such that the bushings 36, 38 support the shaft 22 and allow for the shaft 22 to rotate about a longitudinal axis X passing through the shaft 22. Such rotation is normally facilitated by a user securing a lever to a portion of the cross shaft 22 located outside the housing 30 and using the lever to rotate the shaft 22.

The cross shaft 22 and bevel pinion gear 24 are coupled together by a linking pin 40. The shaft aperture 26 and the pinion gear aperture 28 are aligned and the linking pin 40 is passed through the aligned apertures 26, 28 to link the movement of the pinion gear 24 to the movement of the shaft 22. Thus, as the shaft 22 rotates, the pinion gear 24 rotates. As will be understood by those skilled in the art, the rotational movement of the shaft 22 is passed on to the bevel gear 20, which is engaged to the bevel pinion gear 24, such that when the shaft rotates, the bevel gear 20 rotates, resulting in the raising and lowering of the jack 10.

In an exemplary embodiment of the invention, the linking pin 40 is sized such that the outer diameter of the pin 40 is smaller that the inner diameters of either the shaft aperture 26 or the pinion gear aperture 28. Such an arrangement allows the pin 40 to be accommodated in the apertures 26, 28 without the creation of an interference fit, i.e., the pin 40 fits relatively loosely in the apertures 26, 28. The pin 40 is sized such that removal of the pin 40 from the apertures 26, 28 does not require hammering or any other physical impact on the pin 40 that may damage the pin 40 or other components. Preferably, the pin 40 is sized such that a technician can remove the pin 40 from the apertures 26, 28 by hand and without a need for tools. Optionally, the fit of the pin 40 in the apertures 26, 28 is loose enough that the pin 40 could be removed from the apertures 26, 28 by the force of gravity.

In the exemplary embodiment of the invention, the distal bushing 38 is sized such that the outer diameter of the bushing 38 is smaller that the inner diameter of the distal housing aperture 34. Similar to the previous description of the pin 40, the distal bushing 38 is accommodated in the distal housing aperture 34 without the creation of an interference fit, i.e., the bushing 38 fits relatively loosely in the housing aperture 34. The bushing 38 is sized such that removal of the bushing 38 does not require hammering on the bushing 38. Preferably, the bushing 38 is sized such that a technician can remove the bushing 38 from the aperture 34 by hand and without a need for tools. Optionally, the fit of the distal bushing 38 is loose enough that the bushing 38 could be removed from the aperture 34 by the force of gravity.

The exemplary embodiment of the present invention further includes a compression spring 42, as seen in FIGS. 2 and 3. The compression spring 42 is arranged to secure the linking pin 40 within the shaft and pinion gear apertures 26, 28 upon assembly of the jack assembly 10. In addition the compression spring 42 is arranged to secure the distal bushing 38 within the distal housing aperture 34 upon assembly of the jack assembly 10.

The compression spring 42 is shaped and sized to fit over the portion of the cross shaft 22 located within the housing 30 of the jack 10. Preferably, the spring 42 is sized and shaped to be in compression when assembled within the housing 30. In the exemplary embodiment, a distal end 44 of the spring 42 engages the distal bushing 38 to secure the bushing 38 in the distal housing aperture 34. A proximate end 46 of the spring 42 engages the linking pin 40 to secure the pin 40 within the shaft and pinion gear apertures 26, 28. The distal bushing 38 includes a flat flange 48 that prevents the bushing 38 from falling outside the housing 30 through the distal aperture 38. The spring 42 engages the flat flange 48 of the bushing 38 such that the compression force of the spring 42 secures the flange 48 against the inner surface of the housing 30, and thereby, secures the bushing 38 in the distal housing aperture 34. The linking pin 40 is sized such that the overall height of the pin 40 is shorter than the outside diameter of the pinion gear 24 at the location of the aperture 28 (i.e., when the pin 40 is placed in the apertures 26, 28, the entire pin is positioned within the apertures 26, 28 and no portion of the pin 40 extends outside the apertures 26, 28). In this arrangement, coils located at the proximate end 46 of the spring 42 engage the pin 40 by covering the pinion gear aperture 28, as seen in both FIGS. 2 and 3. The coils of the spring 42 cover the aperture 28 such that the pin 40 is obstructed from falling out of the aperture 28. As the shaft 22 rotates, a loose fitting pin 40 may move slightly along its longitudinal axis due to the force of gravity. However, as the shaft rotates and the pin 40 moves, the coils of the spring 42 covering the open ends of the pinion gear aperture 28 engage the pin 40 to retain and secure the pin 40 within the apertures 26, 28. Optionally, the coils at the proximate end 46 of the spring 42 are wound tightly such that the coils are in contact with adjoining coils, as best seen in FIG. 2. This arrangement of the coils further ensures the linking pin 40 is retained and secured in the apertures 26, 28 during operation of the jack 10.

The preferred arrangement provides for easy and straightforward assembly and disassembly of a jack 10. For example, to assemble the jack 10, the proximate bushing 36 is placed into the proximate housing aperture 32 and the distal bushing 38 is placed into the distal housing aperture 34. One end of the shaft 22 is passed through the distal bushing 34 and into the housing 30, stopping short of exiting the housing 30 through the proximate bushing 36. The compression spring 42 and bevel pinion gear 24 are placed over the end of the shaft 22 within the housing 30 and that end is then passed through the proximate bushing 32. The proximate end 46 of the spring 42 is moved distally, toward the distal bushing 38. The spring 42 is compressed against the flange 48 of the distal bushing 38. This compression of the spring 42 unencumbers and reveals the pinion gear aperture 28. The pinion gear 24 is rotated until the pinion gear aperture 28 aligns with the shaft aperture 26. The linking pin 40 is inserted into the aligned apertures 26, 28 and the spring 42 released. The release of the spring 42 moves the proximate end 46 of the spring toward the pinion gear 24 until the proximate end 46 of the spring 42 covers the pinion gear aperture 28, which retains and secures the pin 40 in the apertures 26, 28. Since the spring 42 is designed to be in compression when installed in the housing 30, the distal end 44 of the spring 42 remains abutted to the flange 48 of the distal bushing 38 and retains and secures the bushing 38 in the distal housing aperture 34.

To disassemble the jack 10, the proximate end 46 of the spring 42 is moved distally and compressed against the distal bushing 38. The pinion gear aperture 28 is uncovered and unencumbered. The pin 40 is manually removed from the aligned apertures 26, 28. The removal of the pin 40 uncouples the bevel pinion gear 24 from the shaft 22 and allows the shaft 22 to be removed from the housing 30.

It should be understood that the assembly and disassembly of the jack 10 may be accomplished in a different order of steps or with different steps than those disclosed above. In addition, the jack assembly 10 optionally includes a cover 50 attached to the housing 30 by at least one self-tapping screw 52. The cover 50 may be removed to access the internal mechanisms of the jack 10 to assemble and disassemble the jack 10.

In another embodiment of the present invention, a compression spring is sized to have a distal end engage the flange 48 of the distal bushing 38 and the proximate end engage a side surface of a linking pin. In this embodiment, the engagement between the spring and the distal bushing 38 is similar as described above. However, the engagement of the spring and a linking pin differs from the description above. The linking pin is sized such that the overall height of the pin is greater than the outside diameter of the pinion gear 24 at the location of the aperture 28 (i.e., when the pin is placed in the shaft and pinion gear apertures 26, 28, portions of the pin extend beyond both ends of the pinion gear aperture 28). In this arrangement, the spring engages the portions of the pin extended from the pinion gear aperture 28 and applies a force to the sides of the pin. This force presses the pin against the inner surfaces of both the pinion gear aperture 28 and the shaft aperture 26. The pin is secured within the apertures 26, 28 by the frictional forces between the pin and the inner surfaces of the apertures 26, 28.

It will be readily understood that the present invention can be practiced to secure only the distal bushing 38 to the distal housing aperture 34. The linking pin may be secured through another known method, such as an interference fit between the pin and shaft and pinion gear apertures. In addition, the present invention may be practiced to secure only the linking pin 40 within the shaft and pinion gear apertures 26, 28. The distal bushing may be secured through another known method, such as an interference fit between the distal bushing and the distal housing aperture. Furthermore, the present invention has been described and illustrated such that only the distal bushing 38 is positioned loosely into the distal housing aperture. However, the present invention may also be practiced with the proximate bushing 36 assembled loosely in the proximate housing aperture 32 and without an interference fit. Similarly as described for the distal bushing 38, a compression spring may be placed over a cross shaft to secure a loose fitting proximate bushing 36 in a proximate housing aperture 32. The compressive force of the spring may be arranged to apply the force directly to a flange of the proximate bushing 36 or the spring may be arranged to indirectly apply the force to the proximate bearing 36 through a bevel pinion gear or other such component of the jack assembly 10.

The embodiments of the present invention as described, illustrated, and claimed offer a number of advantages over the prior art. For example, the embodiments retain the linking pin 40 within the shaft and pinion gear apertures 26, 28 and retain the distal bushing 38 within the distal housing aperture 34 without the need of interference fits. Such arrangements provide for easier assembling and disassembling of the jack 10. Components do not have to be subjected to hammering and similar methods to be removed from the jack 10. The elimination of such methods reduces or eliminates damage to components in the jack assembly 10. Servicing, maintaining, and repairing a jack assembly 10 is easier and more efficient. Additionally, shafts, pinion gears, linking pins, bushings, and housings may be manufactured with a reduced concern for dimensional variances. Finally, original and replacement parts may be used in a greater variety of jack assemblies, because interference fits are no longer critical to the operation of the jacks.

Exemplary embodiments of the present invention have been described above and illustrated in the figures. Modifications and alternations will occur to others upon a reading and understanding of this specification. The claims as follow are intended to include all modifications and alterations insofar as they come within the scope of the claims or the equivalent thereof.

Having thus described the invention, I claim:

1. A retention assembly for a jack comprising:
   a housing having a first housing aperture;
   a first bushing positioned in said first housing aperture;
   a shaft having a shaft aperture, said shaft extending through said first bushing;
   a gear having a gear aperture, said gear positioned on said shaft, wherein said shaft aperture and said gear aperture align;
   a pin positioned in said aligned shaft aperture and gear aperture; and
   a spring positioned on said shaft and within said housing, wherein a first end of said spring applies a force to said first bushing to retain said first bushing in said first housing aperture and a second end of said spring engages said pin to retain said pin in said shaft aperture and said gear aperture.

2. The retention assembly of claim 1, wherein said second end of spring is positioned over a first opening and a second opening of said gear aperture.

3. The retention assembly of claim 2 wherein said second end of spring includes a plurality of coils;
   further wherein, each coil of said plurality of coils is wound so that said coil contacts an adjoining coil.

4. The retention assembly of claim 1, wherein said pin is sized such that a first portion of said pin extends beyond a first opening of said gear aperture and a second portion of said pin extends beyond a second opening of said gear aperture.

5. The retention assembly of claim 4, wherein said second end of spring engages said first portion of pin.

6. The retention assembly of claim 5, wherein said second end of spring engages said second portion of pin.

7. The retention assembly of claim 1, wherein said first bushing includes a flange to prevent said first bushing from passing through said first housing aperture.

8. The retention assembly of claim 7, wherein said first end of spring applies said force to said flange.

9. The retention assembly of claim 1, further comprising a second housing aperture and a second bushing positioned in said second housing aperture;
wherein, said second end of spring applies a force to said second bushing to retain said second bushing in said second housing aperture.

10. A method for retaining a pin and bushing in a jack assembly, said method comprising:
    providing a jack assembly including a housing having a housing aperture, a bushing, a shaft having a shaft aperture, a gear having a gear aperture, a pin, and a spring;
    positioning said bushing in said housing aperture;
    extending said shaft through said bushing;
    positioning said spring on said shaft;
    positioning said gear on said shaft;
    aligning said gear aperture with said shaft aperture;
    positioning said pin in said aligned gear aperture and shaft aperture;
    applying a spring force to said bushing to retain said bushing in said housing aperture; and
    engaging said spring with said pin to retain said pin in said gear aperture and said shaft aperture.

11. The method of claim 10, wherein said spring includes a first end and a second end.

12. The method of claim 11, wherein said second end of said spring is positioned over a first opening and a second opening of said gear aperture.

13. The method of claim 12, wherein said second end of said spring includes a plurality of coils;
    further wherein, each coil of said plurality of coils is wound so that said coil contacts an adjoining coil.

14. The method of claim 12, wherein said pin is sized such that a first portion of said pin extends beyond a first opening of said gear aperture and a second portion of said pin extends beyond a second opening of said gear aperture.

15. The method of claim 14, wherein said second end of said spring engages said first portion of said pin.

16. The method of claim 15, wherein said second end of said spring engages said second portion of said pin.

17. The method of claim 11, wherein said bushing includes a flange to prevent said bushing from passing through said housing aperture.

18. The method of claim 17, wherein said first end of said spring applies said force to said flange.

19. The method of claim 11, further comprising a second housing aperture and a second bushing positioned in said second housing aperture;
    wherein, said second end of said spring applies a force to said second bushing to retain said second bushing in said second housing aperture.

* * * * *